(12) United States Patent
Potkonjak (10) Patent No.: US 9,032,476 B2
(45) Date of Patent: May 12, 2015

(54) SECURE AUTHENTICATION

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 477 days.

(21) Appl. No.: 12/464,387

(22) Filed: May 12, 2009

(65) Prior Publication Data

US 2010/0293612 A1    Nov. 18, 2010

(51) Int. Cl.

| | |
|---|---|
| *G06F 15/16* | (2006.01) |
| *G06F 21/34* | (2013.01) |
| *H04L 9/32* | (2006.01) |
| *H01L 29/06* | (2006.01) |
| *B82Y 20/00* | (2011.01) |
| *H04L 29/06* | (2006.01) |
| *G06F 21/31* | (2013.01) |

(52) U.S. Cl.
CPC ............ *G06F 21/34* (2013.01); *H01L 29/0669* (2013.01); *B82Y 20/00* (2013.01); *H04L 63/0853* (2013.01); *G06F 21/31* (2013.01); *H04L 9/3278* (2013.01)

(58) Field of Classification Search
CPC ..... G06F 21/34; G06F 21/31; H01L 29/0669; H01L 9/3278; B82Y 20/00; H04L 63/0853
See application file for complete search history.

(56) References Cited

U.S. PATENT DOCUMENTS

| | | | |
|---|---|---|---|
| 3,668,319 A | 6/1972 | Gerke et al. | |
| 4,112,495 A | 9/1978 | Easley | |
| 4,523,827 A | 6/1985 | Masunaga et al. | |
| 4,525,849 A | 6/1985 | Wolf | |
| 5,131,038 A * | 7/1992 | Puhl et al. | 340/5.61 |
| 5,133,231 A | 7/1992 | Goto et al. | |

(Continued)

FOREIGN PATENT DOCUMENTS

| | | |
|---|---|---|
| JP | 10003256 A | 6/1998 |
| JP | 2005523481 A | 8/2005 |

(Continued)

OTHER PUBLICATIONS

Gassend, et al. "Silicon physical random functions", 2002, Proceedings of the 9th ACM conference on Computer and Ocmmunications Security, pp. 148-.160.*

(Continued)

*Primary Examiner* — Azizul Choudhury
*Assistant Examiner* — Anthony Fabbri
(74) *Attorney, Agent, or Firm* — Turk IP Law, LLC (57) ABSTRACT

Technologies are generally described for secure authentication tokens that employ hardware public physically unclonable functions. Each unique token can be implemented as hardware such that manufacturing variations provide measurable performance differences resulting in unique, unclonable devices or systems. For example, slight timing variations through a large number of logic gates may be used as a hardware public physically unclonable function of the authentication token. The authentication token can be characterized such that its physical characteristics may be publicly distributed to authenticators. Authenticators may then simulate the result from a particular input vector and then request the authentication token to generate the same result in a very short amount of time. The time may be specified such that the result could not be simulated by an imposter for a timely response.

20 Claims, 7 Drawing Sheets

(56) References Cited

U.S. PATENT DOCUMENTS

| | | | |
|---|---|---|---|
| 5,140,871 A | 8/1992 | Goto et al. | |
| 5,168,777 A | 12/1992 | Isono et al. | |
| 5,182,970 A | 2/1993 | Goto et al. | |
| 5,293,789 A | 3/1994 | Goto et al. | |
| 5,559,961 A * | 9/1996 | Blonder | 726/18 |
| 5,757,912 A * | 5/1998 | Blow | 380/256 |
| 5,770,846 A * | 6/1998 | Mos et al. | 235/440 |
| 5,796,839 A | 8/1998 | Ishiguro | |
| 5,999,629 A * | 12/1999 | Heer et al. | 705/51 |
| 6,018,717 A * | 1/2000 | Lee et al. | 705/13 |
| 6,076,163 A | 6/2000 | Hoffstein et al. | |
| 6,098,144 A | 8/2000 | De Oliveira | |
| 6,140,935 A * | 10/2000 | Hayton et al. | 340/5.2 |
| 6,289,324 B1 * | 9/2001 | Kawan | 705/41 |
| 6,446,206 B1 * | 9/2002 | Feldbaum | 713/175 |
| 6,687,714 B1 * | 2/2004 | Kogen et al. | 1/1 |
| 6,832,181 B1 * | 12/2004 | Bolding et al. | 703/13 |
| 7,098,144 B2 * | 8/2006 | Zhang et al. | 438/734 |
| 7,156,301 B1 * | 1/2007 | Bonalle et al. | 235/380 |
| 7,172,112 B2 * | 2/2007 | Bonalle et al. | 235/379 |
| 7,185,175 B2 | 2/2007 | Kravec et al. | |
| 7,191,333 B1 | 3/2007 | Maddury et al. | |
| 7,206,847 B1 * | 4/2007 | Alberth et al. | 709/229 |
| 7,228,155 B2 * | 6/2007 | Saunders | 455/558 |
| 7,255,745 B2 * | 8/2007 | Zhang et al. | 117/94 |
| 7,306,158 B2 * | 12/2007 | Berardi et al. | 235/492 |
| 7,376,839 B2 * | 5/2008 | Carta et al. | 713/185 |
| 7,418,717 B1 * | 8/2008 | Dolske et al. | 719/328 |
| 7,574,611 B2 * | 8/2009 | Cohen | 713/300 |
| 7,609,092 B2 * | 10/2009 | Wicki et al. | 327/2 |
| 7,681,103 B2 | 3/2010 | Devadas et al. | |
| 7,757,083 B2 * | 7/2010 | Devadas et al. | 713/168 |
| 7,761,714 B2 | 7/2010 | Luzzi et al. | |
| 7,825,774 B2 | 11/2010 | O'Toole et al. | |
| 7,840,803 B2 | 11/2010 | Clarke et al. | |
| 7,904,731 B2 | 3/2011 | Devadas et al. | |
| 8,020,125 B1 * | 9/2011 | Kuehlmann et al. | 716/106 |
| 8,347,091 B2 | 1/2013 | Nonaka et al. | |
| 8,838,976 B2 * | 9/2014 | Etchegoyen | 713/176 |
| 2003/0103628 A1 * | 6/2003 | Luc et al. | 380/265 |
| 2003/0177374 A1 * | 9/2003 | Yung et al. | 713/189 |
| 2003/0204743 A1 | 10/2003 | Devadas et al. | |
| 2003/0212829 A1 | 11/2003 | Schofield et al. | |
| 2004/0026684 A1 * | 2/2004 | Empedocles | 257/14 |
| 2004/0054907 A1 * | 3/2004 | Chateau et al. | 713/176 |
| 2004/0056416 A1 * | 3/2004 | Bennett, III | 273/269 |
| 2004/0078421 A1 * | 4/2004 | Routt | 709/201 |
| 2004/0098585 A1 * | 5/2004 | Grove et al. | 713/168 |
| 2004/0114765 A1 * | 6/2004 | Liardet et al. | 380/277 |
| 2004/0184615 A1 * | 9/2004 | Elliott et al. | 380/283 |
| 2005/0015411 A1 * | 1/2005 | Altman | 707/200 |
| 2005/0093868 A1 * | 5/2005 | Hinckley | 345/502 |
| 2005/0105366 A1 * | 5/2005 | Pedlow | 365/225.7 |
| 2005/0154858 A1 | 7/2005 | Kravec et al. | |
| 2005/0225079 A1 * | 10/2005 | Woontner | 283/110 |
| 2005/0268096 A1 * | 12/2005 | Kilian-Kehr et al. | 713/168 |
| 2006/0010079 A1 * | 1/2006 | Brickell | 705/67 |
| 2006/0087950 A1 * | 4/2006 | Linnartz | 369/100 |
| 2006/0119883 A1 | 6/2006 | Zhang et al. | |
| 2006/0119913 A1 * | 6/2006 | Moon | 359/2 |
| 2006/0248340 A1 * | 11/2006 | Lee et al. | 713/181 |
| 2006/0271793 A1 | 11/2006 | Devadas et al. | |
| 2007/0044139 A1 * | 2/2007 | Tuyls et al. | 726/2 |
| 2007/0174629 A1 | 7/2007 | Suominen | |
| 2007/0183194 A1 | 8/2007 | Devadas et al. | |
| 2008/0141364 A1 * | 6/2008 | Skoric et al. | 726/20 |
| 2008/0229119 A1 * | 9/2008 | Skoric et al. | 713/193 |
| 2008/0231418 A1 * | 9/2008 | Ophey et al. | 340/5.85 |
| 2008/0237506 A1 * | 10/2008 | Ophey et al. | 250/580 |
| 2008/0256600 A1 * | 10/2008 | Schrijen et al. | 726/2 |
| 2009/0083833 A1 * | 3/2009 | Ziola et al. | 726/2 |
| 2009/0169018 A1 * | 7/2009 | Deisher | 380/278 |
| 2009/0183248 A1 | 7/2009 | Tuyls et al. | |
| 2009/0222672 A1 | 9/2009 | Clarke et al. | |
| 2009/0271860 A1 * | 10/2009 | Nonaka et al. | 726/16 |
| 2009/0282259 A1 * | 11/2009 | Skoric et al. | 713/185 |
| 2010/0085075 A1 | 4/2010 | Luzzi et al. | |
| 2010/0122093 A1 * | 5/2010 | Tuyls et al. | 713/180 |
| 2010/0127822 A1 | 5/2010 | Devadas | |
| 2010/0293384 A1 | 11/2010 | Potkonjak et al. | |
| 2010/0322418 A1 | 12/2010 | Potkonjak et al. | |

FOREIGN PATENT DOCUMENTS

| | | |
|---|---|---|
| JP | 2008516472 A | 5/2008 |
| WO | 2008056612 A1 | 5/2008 |
| WO | 2009002599 A2 | 12/2008 |
| WO | 2011016900 | 2/2011 |

OTHER PUBLICATIONS

Suh et al.; Physical Unclonable Functions for Device Authentication and Secret Key Generation; 6 Pages.*

Bellare, M., et al., "Entity Authentication and Key Distribution", Aug. 1993, Advances in Cryptology—Crypto '93 Proceedings, 29 pages.

Burrows, M., et al., "A Logic of Authentication", Feb. 1990, ACM Transactions on Computer Systems, 8(1):18-36.

Chang, C., et al., "Remote Password Authentication with Smart Cards", May 1991, IEE Proceedings-E, 138(3):165-168.

Flajolet, et al., "Birthday Paradox, Coupon Collectors, Caching Algorithms and Self-Organizing Search", 1987, INRIA: Unite de Recherche INRIA-Rocquencourt, No. 720, 20 pages.

Gassend, et al., "Controlled Physical Random Functions", Dec. 9-13, 2002, Proceedings of the 18$^{th}$ Annual Computer Security Applications Conference, 12 pages.

Halevi, S., et al., "Public-Key Cryptography and Password Protocols", 1998, ACM Transactions on Information and System Security, pp. 230-268, Abstract.

Haller, N., "The S/Key™ One-Time Password System", 1994, Proceedings of the Internet Society Symposium on Network and Distributed Systems, pp. 151-157.

Lamport, L., "Password Authentication with Insecure Communication", Nov. 1981, Communications of the ACM, 24(11):770-772.

Lampson, B., et al., "Authentication in Distributed Systems: Theory and Practice", Nov. 1992, ACM Transactions on Computer Systems, 104):265-310.

Majzoobi, et al., "Lightweight Secure PUFs", 2008, IEEE/ACM International Conference on Computer Aided Design (ICCAD), 4 pages.

Majzoobi, et al., "Testing Techniques for Hardware Security", 2008, IEEE International Test Conference, 10 pages.

Morris, R., et al., "Password Security: A Case History", 1979, Communications of the ACM, vol. 22, pp. 594-597.

Needham, R., et al., "Using Encryption for Authentication in Large Networks of Computers", Dec. 1978, Communications of the ACM, 21(12):993-999.

Neuman, B., et al., "Kerberos: An Authentication Service for Computer Networks" Sep. 1994, ISI Research Report, ISI/RS-94-399, IEEE Communications Magazine, 32(9):33-38.

Saxena, et al., "Variation in Transistor Performance and Leakage in Nanometer-Scale Technologies", Jan. 2008, IEEE Transactions on Electron Devices, 55(1):131-144.

Suh, G., et al., "Physical Unclonable Functions for Device Authentication and Secret Key Generation", Jun. 4-8, 2007, DAC 2007, San Diego, California, 6 pages.

Wagner, D., "A Generalized Birthday Problem", 2002, Crypto, pp. 288-303.

Boneth et al., "Short Signatures from the Weil Pairing," Dec. 9-13, 2001, Proceedings of the 7th International Conference on the Theory and Application of Cryptology and Infromation Security: Advances in Cryptology, p. 514-532.

Boyar et al., "Convertible Undeniable Signatures," Aug. 11-15, 1990, Proceedings of the 10th Annuual International Cryptology Conference on Advances in Cryptology, p. 189-205.

Chaum et al., "Undeniable signatures," Jul. 1989, Proceedings on Advances in cryptology, Santa Barbara, California, p. 212-216.

(56) References Cited

OTHER PUBLICATIONS

Horster et al, "Meta-ElGamal signature schemes," Nov. 1994, Proc. of the 2nd ACM Conference on Computer and communications security, p. 96-107. Abstract.

Ngai et al., "A review for mobile commerce research and applications," Feb. 2007, Decision Support Systems, 43 (1.): 3-15.

Tuyls et al., "Read-proof hardware from protective coatings", Oct. 10-13, 2006, Cryptographic Hardware and Embedded Systems—CHES 2006, ser. Lecture Notes in Computer Science, vol. 4249, pp. 369-383.

Diffie et al., "New Directions in Cryptography", IEEE Transactions on Information Theory. IT-22(66):644-654, Nov. 1976.

ElGamal, "A Public.Key Cryptosystem and a Signature Scheme Based on Discrete Logarithms," Jul. 1985, IEEE Trans. on Information Theory. IT-31(4): 469-472.

Fiat, et al., "How to prove yourself: practical solutions to identification and signature problems," Jan. 1987, Proceedings on Advances in Cryptology—CRYPTO '86, p. 186-194.

Gassend, et al. "Silicon Physical random functions", 2002, Proceedings of the 9th ACM conference on Computer and Ocmmunications Security, pp. 148-160.

Goldwasser et al, "A digital signature scheme secure against adaptive chosen-message attacks," SIAM Journal on Computing, 17(2):281-308, Apr. 1988.

Hernandez-Velez, M. "Nanowires and 1D arrays fabrication: An Overview"; Thin Solid Films 495(1-2): 51-63, Jan. 2006. Abstract.

Holcomb et al., "Initial SRAM State as a Fingerprint and Source of True Random Numbers for RFID Tags", Jul. 2007, Proceedings of the Conference on RFID Security, 12 pages.

Lee et al., "A technique to build a secret key in integrated circuits for identification and authentication application", Jun. 17-19, 2004, Symopsium on VLSI Circuits, Digest of Technical Papers, pp. 176-179.

Lim et al., "Extracting secret keys from integrated circuits", 2005, IEEE Transactions on Very Large Scale Integration (VLSI) Systems, 13(10): 1200-1205.

Lysyanskya, Anna, "Signature Schemes and Applications to Cryptographic Protocol Design", PhD thesis, MIT, Sep. 2002, 134 pages.

Merkle, Ralph "A certified digital signature", 1989, Proceedings on Advances in Cryptology—CRYPTO '89, vol. 435, pp. 218-238.

Messerges et al., "Digital rights management in a 3G mobile phone and beyond," Oct. 2003 Proceedings of the 3rd ACM workshop on Digital rights management, pp. 27-38.

Paterson, K. "ID-based signatures from pairings on elliptic curves," Aug. 29, 2002, Electronics Letters, 38(18):1025-1026.

Ravikanth, P., "Physical one-way functions", Mar. 2001, Thesis, MIT, 154 pages.

Rivest, et al., "A method for obtaining digital signatures and public-key cryptosystems," Feb. 1978, Communications of the ACM, 21(2): 120-126.

Shamir, Adi "Identity-based cryptosystems and signature schemes," Aug. 1985, Proceedings of CRYPTO 84 on Advances in cryptology, p. 47-53.

Xia et al, "One-Dimensional Nanostructures: Synthesis, Characterization, and Applications," Mar. 4, 2003, Advanced Materials, 15(5): 353-389.

Leslie Lamport, "Constructing Digital Signatures From a One-Way Function," Technical Report CSL-98, SRI International, Oct. 1979.

Michael O. Rabin, "Digitalized Signatures as Intractable as Factorization," Technical Report MIT/LCS/TR-212, MIT Laboratory for Computer Science, Jan. 1979.

Mambo.M et al, "Proxy Signatures for Delegating Signing Operation," Proceedings of the 3rd ACM Conference on Computer and Communications Security, p. 48-57, Mar. 14-15, 1996, New Delhi, India.

U.S. Office Action dated Jun. 12, 2012 in U.S. Appl. No. 12/486,451.

U.S. Office Action dated Feb. 1, 2012 in U.S. Appl. No. 12/464,384.

International Search Report & Written Opinion dated Feb. 1, 2011 in PCT Application No. PCT/US10/37918.

Alkabani et al., "Input Vector Control for Post-Silicon Leakage Current Minimization in the Presence of Manufacturing Variability." 2008, Proc. of the 45th Annual design automation conference (DAC '08), pp. 606-609. Abstract.

Alkabani et al., "Trusted Integrated Circuits: A Nondestructive Hidden Characteristics Extraction Approach." 2008, Information Hiding, Lecture Notes in Computer Science, 5284/2008: 102-117. Abstract.

Beckmann et al., "Hardware-Based Public-Key Cryptography with Public Physically Unclonable Functions," 2009, 11th International Workshop 2009 on Information Hiding, Darmstadt, Germany, Jun. 8-10, 2009, Lecture Notes in Computer Science, vol. 5806/2009, pp. 206-220.

Chaum, D., "Blind Signatures for Untraceable Payments", 1983, Advances in Cryptology: Proceedings of Crypto 82, Plenum Press, pp. 199-203.

Chaum, D., "Untraceable Electronic Mail, Return Addresses, and Digital Pseudonyms", Feb. 1981, Communications of The ACM, 24(2): 84-90.

Feige, et al., "Zero Knowledge Proofs of Identity", Jun. 1988, Journal of Cryptology, 1(2):77-94.

Kocher, P., "Timing Attacks on Implementations of Diffie-Hellman, RSA, DSS, and Other Systems", 1996, CRYPTO '96, LNCS 1109, Springer-Verlag, Berlin, 10 pages.

Okamoto, T., et al., "A New Public-Key Cryptosystem as Secure as Factoring", 1998, Eurocrypt '98, LNCS 1403, Abstract.

Paillier, P., "Public-Key Cryptosystems Based on Composite Degree Residuosity Classes", 1999, Advances in Cryptology—Eurocrypt '99, vol. 1592 of Lecture Notes in Computer Science, pp. 223-238.

Pappu, R., et al., "Physical one-way functions," Science, vol. 297, No. 5589, Sep. 20, 2002, pp. 2026-2030.

Shamsi et al., "Noninvasive Leakage Power Tomography of Integrated Circuits." 2008, Proceedings of the 13th International Symposium on Low Power Electronics and Design (ISLPED'08), ACM, pp. 341-346.

Office Action dated Nov. 11, 2013 in Chinese Application Serial No. 201090027751.8.

Notice of Allowance dated Nov. 20, 2013 in Korean Application Serial No. 10-2012-7001357.

Notice of Allowance dated Sep. 30, 2013 in U.S. Appl. No. 12/464,384.

Office Action dated Feb. 25, 2012 in Japanese Application Serial No. 2012-515096.

Office Action dated Aug. 30, 2013 in Japanese Application Serial No. 2012-515096.

Chang, C. and Wu, T., "Remote Password Authentication with Smart Cards," IEEE Proceedings, vol. 138, Issue 3, May 1991, pp. 165-168.

U.S. Notice of Allowance dated Nov. 2, 2012 in U.S. Appl. No. 12/486,451.

U.S. Office Action dated Oct. 2, 2012 in U.S. Appl. No. 12/464,384.

Bellare, M. et al., "Relations Among Notions of Security for public-Key Encryption Schemes," Advances in Cryptology—Crypto '98 Proceedings, Lecture Notes in Computer Science, vol. 1462, pp. 32, Springer-Verlag (1999).

Boneh, D. and Franklin, M., "Identity-Based Encryption from the Weil Pairing," SIAM Journal of Computing, vol. 32, No. 3, pp. 586-615 (2003).

\* cited by examiner

SECURE AUTHENTICATION

BACKGROUND

Authentication in information and communication security systems relates to establishing that a user or system is who or what the user or system purports to be. Using a secret password or code to control user access to a computer system is a simple example of authenticating a user. Passwords or codes can be copied, divulged, or guessed by imposters, attackers, or hackers. Requiring the presence of a physical item for authentication can assist in mitigating this security risk. However, physical items can be duplicated or otherwise mechanically circumvented.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures, can be arranged, substituted, combined, separated, and designed in a wide variety of different configurations, all of which are explicitly contemplated herein.

This disclosure is drawn to methods, apparatus, systems and computer program products related to secure authentication using hardware public physically unclonable functions. Traditional cryptographic mechanisms may be used for secure authentication. While traditional cryptographic techniques generally employ mathematical and computational approaches, physical laws and technology constraints may also be employed. For example, inherent manufacturing variability in semiconductor integrated circuits (ICs), particularly at very deep submicron technology scales, may be leveraged to produce unique, unclonable systems. The unclonable nature of such a device or system can provide the basis of a secure authentication feature.

Inherent manufacturing variability in modern and future complimentary metal-oxide semiconductor (CMOS) technologies can introduce gate-level uniqueness within each instance of manufacture. Various technological challenges arise when attempting to fabricate ICs with exact feature sizes for gates and interconnecting conductors. Similar challenges may affect doping levels. These challenges may include wafer lattice structure imperfections, non-uniform dopant distribution, mask misalignment, and chemical or mechanical polishing. As such, each manufactured IC of a single design may generally have gates that differ slightly in terms of their timing, area, power, and soft-error rate susceptibility. Operating such ICs in a manner as to manifest these subtle differences can provide ICs with unique operational characteristics. Similarly, photonic crystal based optical inter-chip and intra-chip interconnects may be leveraged as for their unique operational characteristics due to manufacturing variability. Such photonic interconnects can support high throughput and low delay distribution for signals and clocks.

An authentication token can be a physical device, or system, operable to uniquely identify, or authenticate, the associated individual or system to be who or what it purports to be. Authentication tokens may be referred to herein as "tokens." An authentication token can be implemented as a large number of logic gates with an input register supplying inputs into the gates and an output register to latch the results from the gates at a specified time period later. A host computer interfaced to the unique authentication token can specify an input vector and a clocking period as an authentication challenge. Authentication can begin by issuing the input vector to an input register of the token. After the signals associated with the input vectors propagate through the logic gates, the results can be latched into the output register and restored to the host computer. The authentication token can generate the results in real-time, for example, in one or a few clock cycles. Since the results depend on timing characteristics of each gate, an attacker would have to simulate or emulate the authentication token at the gate-level with exact timing accuracy.

If the number of gates in the authentication token is given by N, simulation has a complexity of $O(N^3)$ for each input vector cycle and multiple cycles may be employed. Thus, for 100,000 gates, an attacker would require more than $10^{15}$ operations to be completed for simulating the authentication token and generating the required results. In contrast, the authentication token can provide the results in one or a few clock cycles. As such, authentication as fast as one nanosecond and having an energy consumption of a few nanojoules may be possible.

The host computer, or other authenticator, can probabilistically check the correctness of the results supplied by the authentication token. The authenticator can calculate relatively few outputs without time constraint. The authenticator can check C values within the results to probabilistically ensure that the success likelihood of a random attacker would be $2^{-C}$. For example, checking 100 outputs, can provide a random attacker success likelihood of $2^{-100}$ or about $10^{-30}$.

The authentication token can map a specified input into unique outputs in one or few clock cycles. While it is easy to verify a small subset of the outputs, it is prohibitively slow to try to compute all outputs. Thus, protocols that require that potential attackers to conduct complete simulations under real-time constraints can provide authentication schemes with a high level of security. It is this complexity gap between results provided by the authentication token and complete simulation along with the complexity gap between partial verification and complete simulation that can support powerful and flexible secure authentication.

Figure 1:
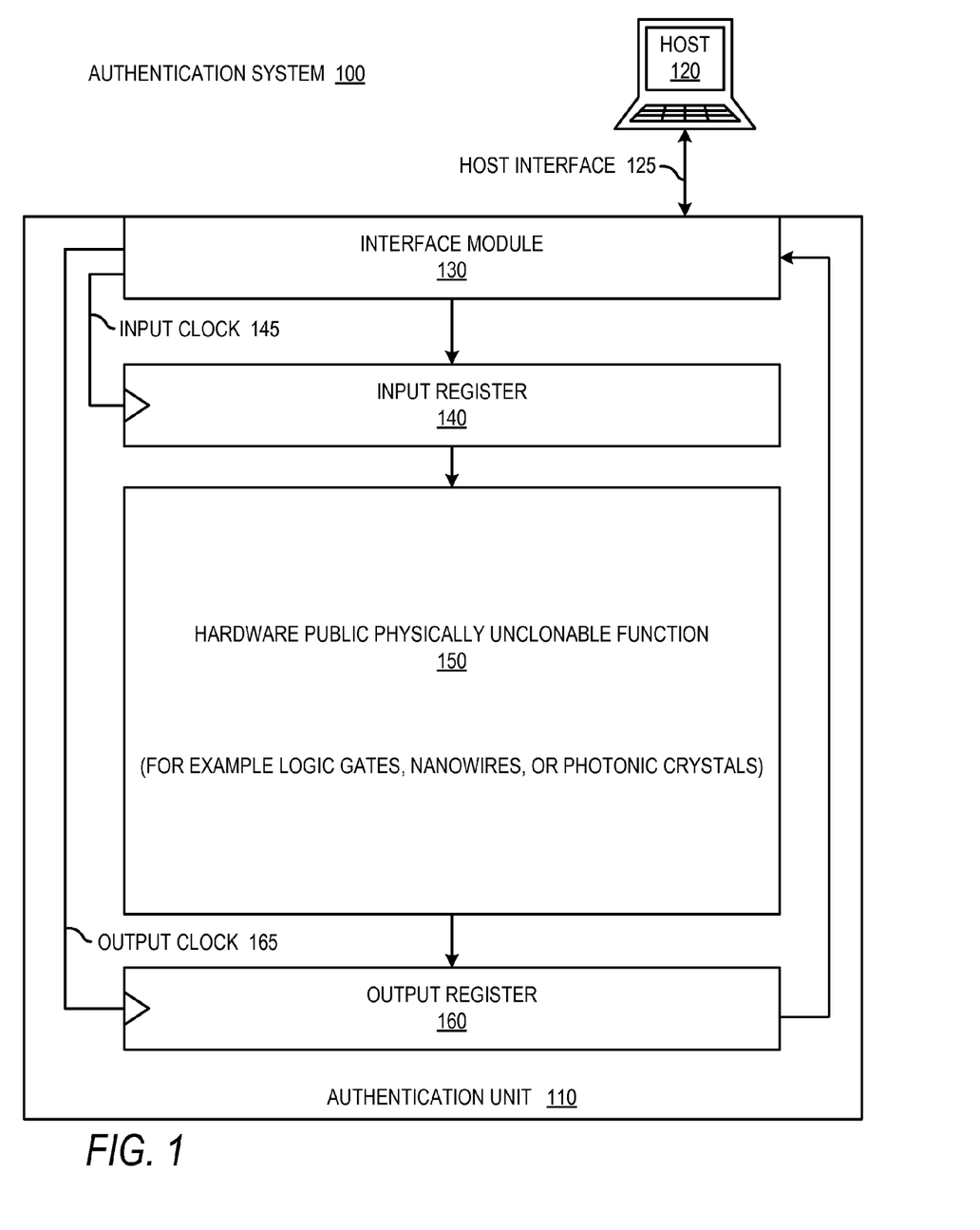
FIG. 1 is a block diagram illustrating an authentication system with a host computer and a secure authentication unit.

Turning now to FIG. 1, an authentication system 100 with a host computer 120 and an authentication unit 110 is illustrated according to one or more embodiments presented herein. The authentication unit 110 may also be referred to as an authentication token. The host computer 120 may access the authentication unit 110 in order to authenticate the presence of a specific authentication unit 110 on the host interface 125.

The authentication unit 110 can be manufactured such that each individual instance of the manufacturing process produces an authentication unit 110 that is unique from other authentication units 110. As such, the physical possession of an authentication unit 110 can be used to authenticate a user or resource associated with the host computer 120 for security purposes.

The host interface 125 may be any computer interface. For example, the host interface 125 may be serial, parallel, universal serial bus (USB), peripheral component interconnect (PCI), wired, wireless, Bluetooth, radio frequency identification (RFID), fiber optical, free space optical, or any other interface reasonable for coupling the authentication unit 110 to the host computer 120. An interface module 130 within the authentication unit 110 can provide an interface between the authentication unit 110 and the host interface 125 for communicating information to and from the host computer 120.

The host computer 120 may offer an authentication challenge to the authentication unit 110. The authentication challenge may be a request for the authentication unit 110 to provide a computed response that may only be computed by the unique authentication unit 110 instance and thus demonstrates the presence of the specific authentication unit 110. The authentication challenge may be offered to the authentication unit 110 by communicating the authentication challenge to the interface module 130 of the authentication unit 110.

An input vector of the authentication challenge may be provided as the initial values to be clocked into the input register 140 from the interface module 130. An input clock 145 may be used to clock the inputs into the input register 140. The input vector, once clocked into the input register 140, can feed into the hardware public physically uncloneable function (HPPUF) 150.

The HPPUF 150 can be manufactured as a plurality of logic gates, semiconductor signal paths, an array of plasmonic paths, a photonic crystal structure, nanowire gates, any other nanowire structure, or any structure that may be varied slightly in each manufacturing instance in a fashion that affects the operation of the structure as measured. The variation in the structure between manufacturing instances may be does to manufacturing process variances, intentional manufacturing perturbations, or both. In a combinational logic HPPUF 150 embodiment, manufacturing variability can manifest as each logic gate having different delay, power, or other physical characteristics even between integrated circuits that correspond to the same design. The HPPUF 150 is a physical system that may be completely characterized so that it can be accurately simulated. However, the HPPUF 150 simulation can require a much longer time than the execution of the actual HPPUF 150 hardware.

Resulting output values from the HPPUF 150 can arrive at the output register 160. An output clock 165 can latch the output values of the HPPUF 150 into the output register 160 at a specified time. The output clock 165 can be generated at a specific time delay or phase offset from the input clock 145. A timing mechanism such as a timer, delay, phase locked loop, or otherwise may support the generation of a transition in the output clock 165 at the specified time after the transition in the input clock 145 that began the signal propagation through the HPPUF 150. The output values latched into the output register 160 can be delivered to the interface module 130 for access over the host interface 125 to the host computer 120. An authentication challenge can include specifying values to the authentication unit 110 to be loaded into the input registers 140 along with a specified time for clocking the output values into the output register 160 using output clock 165.

The time required for complete simulation of all possible outputs of the HPPUF 150 can require a very long time even using today's most advanced technology. For example, the time for complete simulation may require on the order of years, decades, centuries, or longer. In contrast, the calculation of outputs using the HPPUF 150 hardware itself may require less than a nanosecond. Also, probabilistic verification of a small randomly selected subset of outputs can be done on the order of milliseconds. Thus, it may be considered impossible to emulate the HPPUF 150 rapidly enough to respond to a time-limited authentication challenge, but the same challenge may be computationally reasonable to statistically verify.

The authentication unit 110 may be considered intrinsically resilient against side channel attacks, physical attacks, and software vulnerabilities. The authentication unit 110 may be inexpensive to manufacture and may be ultra fast and ultra low power. The authentication unit 110 can be used in numerous applications such as credit cards, identification cards, passports, subscriber identity modules (SIMs), smart financial notes, or various other authentication applications.

Unlike public key-based authentication techniques, the authentication unit 110 may not depend upon unproven mathematical challenges. The authentication unit 110 may be considerably less expensive, faster, and more power conserving than traditional authentication approaches. Also, existing attempts at hardware based IC identification and authentication generally required authentication information to be generated and stored prior to use at an authentication authority. Therefore, authentication at multiple locations requires that the information be stored at each location opening opportunity for potential attackers. Furthermore, traditional approaches involve an initial exchange of secret information. In contrast, the authentication unit 110 may operate without storing secret information and without an initial exchange of secret information.

One authentication unit 110 can employ one or more HPPUFs 150. For multiple HPPUFs 150, the input vectors may be identical or different. The input vectors may be derived from seeded random number generators. The input vectors may be provided by a periodic or quasi-stationary random process. A single challenge can request the calculation of HPPUF 150 outputs for a randomly selected input vector within a specified time interval. An authentication can also involve requesting multiple challenges. Multiple outputs or portions of outputs from one or more HPPUFs 150 may be used to support challenges of diverse simulation computational difficulty. For example, the HPPUFs may have different sizes and simulation requirements. Authentication challenges may also request the input that produces a specific output or an output that has a specified set of properties. The output from the HPPUF 150 may be applied to a hash function.

Time, radiation, electro-migration, and other effects may cause an HPPUF 150 to drift from its initial characterization. If this occurs, the hardware authentication unit 110 may generate results that no longer correspond to simulations based on the public characterization of the authentication unit 110. Instead of being discarded, such an authentication unit 110 may be re-characterized and returned to use with an updated set of public descriptor information corresponding to its new physical properties.

Input data associated with an authentication challenge can be supplied to the authentication unit 110 using a high bandwidth interconnect such as plasmonic, photonic crystal, radio frequency, or three-dimensional structures. An authentication challenge may be generated randomly, pseudo-randomly, or using any other technique. Expected responses to the generated authentication challenge may be precomputed via simulation just prior to issuing the challenge to the authentication unit 110. The expected response may be stored by the authenticator for verifying the response from the authentication unit 110 with very low time delay.

The input vectors for an authentication challenge may be expanded by seeding or initializing ciphers, shift registers, linear feedback shift registers, random number generators to produce an increased number of input bits, or in any other manner. Multiple challenges may be issued with proper authentication requiring a certain number of those being answered correctly in the specified time.

The authentication unit 110 may be used for various secure transitions, authentication of wireless or wired messages or packet, email authentication, subscriber identification module (SIM) for wireless customers or devices, or for any other purposes. For example, a customer and a service provider may be equipped with an authentication unit 110 for supporting mutual authentication of one another. According to another example, financial transactions may be authenticated where a bank or credit institution has information regarding gate delay, gate power, or other physical characteristics to simulate the HPPUF 150 results.

The authentication unit 110 may be used for authenticating user access to computers, devices, rooms, cars, and other physical or virtual spaces. The authentication unit 110 may be used for authenticating and tracking patients at hospitals or other locations. The authentication unit 110 may be also used for authenticating and tracking packages, shipping containers, and vehicles.

The authentication unit 110 may be used in conjunction with a personal identification number (PIN) or other type of password, code, pass code, or biometric authentication. The authentication unit 110 may also be used in conjunction with existing or traditional authentication techniques.

The authentication unit 110 may be multimodal where answers to challenges may provide analog and/or digital signals. The signals may be established by gate delays, difference in gate delays, switching power, leakage power, and other physical or operations characteristics that can be measured from the authentication unit 110. The HPPUF 150 may employ multiplexers for eliminating logic or signal races between reconvergent paths within the HPPUF 150.

A nanowire structure may be the basis of the HPPUF 150. Nanowire structures may include very tiny wire structures having cross-sections on the order of about 100 nanometers or less. Nanowire structures may be self assembling. A photonic crystal structure may also be the basis of the HPPUF 150. Such a photonic crystal may be considered a photonic nanostructure capable of interacting optically with electromagnetic waves.

Figure 2:
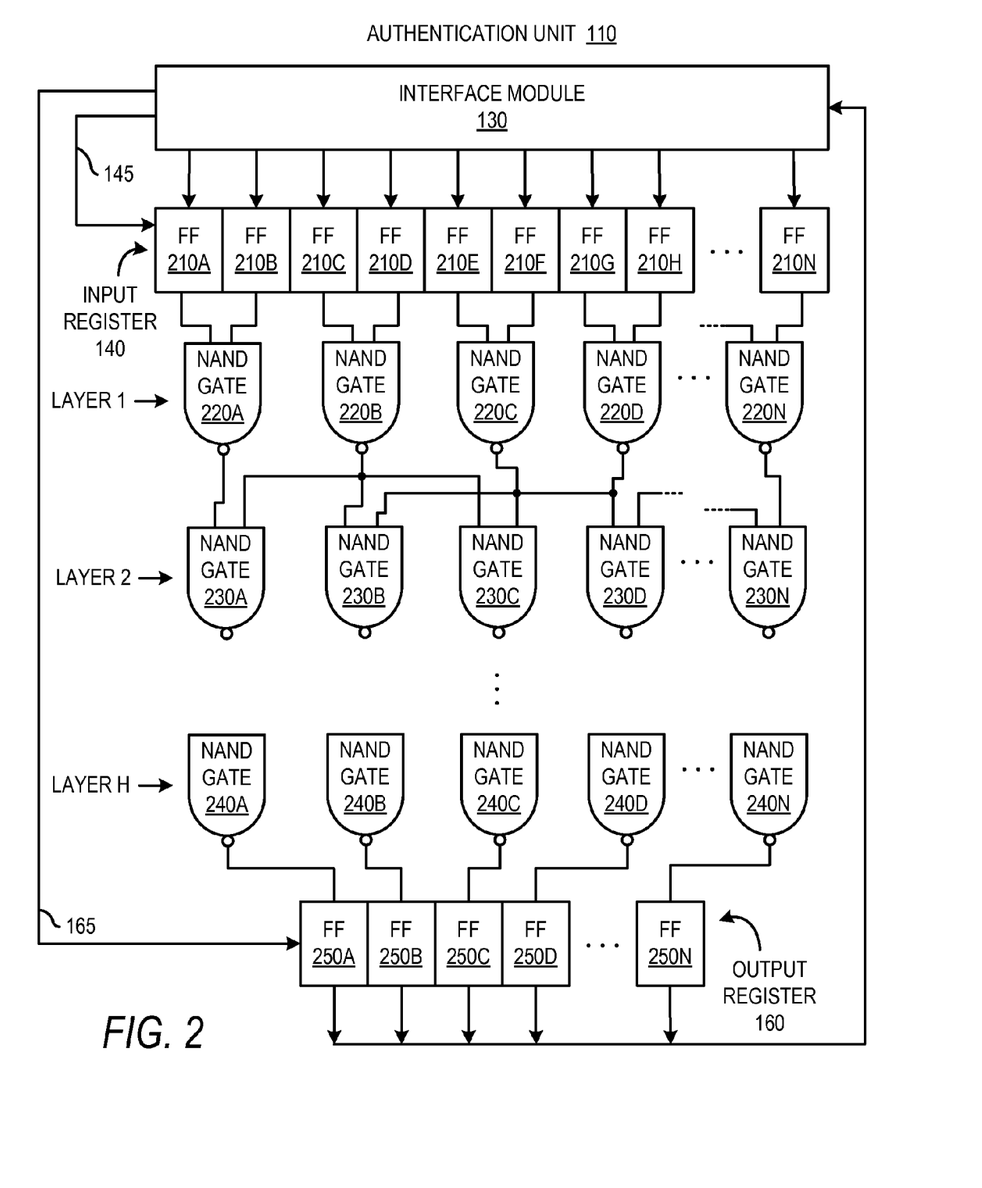
FIG. 2 is a block diagram illustrating an authentication unit using a logic gate-based hardware public physically unclonable function.

Turning now to FIG. 2, an authentication unit 110 using a logic gate hardware public physically unclonable function 150 is illustrated according to some embodiments presented herein. The input register 140 can be implemented as a collection of flip-flops 210A-210N. The flip-flops can be clocked by input clock 145 from the interface module 130. The outputs of the flip flops 210A-210N making up the input register 140 may serve as inputs to a first layer of NOT-AND (NAND) gates 220A-220N. The outputs from the first layer of NAND gates 220A-220N may serve as inputs to a second layer of NAND gates 230A-230N. The outputs from the second layer of NAND gates 230A-230N may serve as inputs to further layers of NAND gates continuing to layer H of NAND gates 240A-240N.

The outputs from layer H of NAND gates 240A-240N may serve as inputs into the output register 160. The output register 160 may be made up of an array of flip-flops 250A-250N. The output flip-flops 250A-250N can be clocked by an output clock 165. The outputs of the output of the output register 160 may feed back to the interface module 130 for response to the host computer 120.

The HPPUF 150 may be formed from NAND gates as illustrated, however other types of logic gates may also be used. It should be appreciated that multiple input logic gates, such as two-input, three-input, four-input, or otherwise may be used as the logic gates making up the HPPUF 150. Mixed types of logic gates and gates with varying numbers of inputs may be used within a single HPPUF 150. For example, OR gates, NOT-OR (NOR) gates, AND gates, NAND gates, exclusive-OR (XOR) gates, or other types of combinational logic may be used within the HPPUF 150. The interconnection between layers of logic gates, for example between the first layer of NAND gates 220A-220N and the second layer of NAND gates 230A-230N may be any variety of interconnections from one layer to the next, such that the outputs of each layer are reasonably dependent on a variety of inputs from the previous layer. The number of output flip-flops 250A-250N may generally be the same as the number of input flip-flops 210A-210N, although these two numbers may also vary.

The width of the HPPUF 150, or W, may be related to either one of, or both of, the number of input flip-flops 210A-210N and the number of output flip-flops 250A-250N. The number of layers within the HPPUF 150, or H, may be considered the height of the HPPUF 150. It may be advantageous for the product ($W \times 2^H$) to be large. For example, a value of around a million for the product ($W \times 2^H$) can generally support a secure authentication. Other values may also be used according to embodiments. It may also generally be desirable for $2^W$ to be approximately $10^{50}$ for certain embodiments. Thus a value for W can be any value, but generally 50-300 can support secure authentication. It may be desirable to have a value for W of around one hundred with a few hundred being sufficient for ultra high security. Values for H can be in the range of 2-20. A value of H=10 can generally be sufficient for secure authentication, while a value of H=20, or more, may support very high security.

Manufacturing variability within the semiconductor process for forming the authentication unit 110 (and specifically, the logic gates of the HPPUF 150) can allow for uniqueness of each individually manufactured authentication unit 110. For example, structure sizes and electrical characteristics of semiconductor structures or transistors within each gate may slightly alter the speed, delay, or timing related to each gate relative to other gates.

For example in one manufactured instance of the authentication unit 110, NAND gate 220A may have more delay than NAND gate 220B. In another manufactured instance, NAND gate 220B may have more delay than NAND gate 220A. These variances may be related to manufacturing variability such as lithographic alignment, doping, metallization, or other semiconductor manufacturing characteristics. Variation in the delay of a signal through the logic gates within the HPPUF 150 can cause the output at each layer to contain multiple transitions as one gate generates its output later than another respective logic gate. For example, if NAND gate 220A has more delay than NAND gate 220B, the output from layer one into layer two will see a transition as NAND gate 220B delivers its output and then an additional transition at a slighter later time as NAND gate 220A generates its output.

At each of the H layers within the HPPUF 150, the number of transitions in the signals can be multiplied to the point where at the final layer, or layer H, the outputs vary for several sets of values over a time period beginning at the fastest signal to arrive at the output until quiescence at the final logic output. This period of output variability provides a window during which the output clock 165 may specifically sample a set of outputs. Because the timing variability between the various logic gates may be unique to each manufactured instance of the authentication unit 110, the specific logic states sampled at the output register 160 at a specific time may also be unique to the authentication unit 110. Sampling this time instance as the result of the HPPUF 150 can provide the unique operation and output for authentication using the authentication unit 110. Because exact sampling may be difficult, a response may be accepted as correct if it matches the output state of the HPPUF 150 over a small time window of variation around the specified sampling time.

When a specific instance of the authentication unit 110 is manufactured, the timing characteristics identified above may be characterized and distributed as public information regarding that instance of the authentication unit 110. The public information regarding the particular authentication unit 110 may be used by an authenticator to predetermine the specific output that will be generated by that instance of the HPPUF 150 within that particular authentication unit 110. While this simulation might take up to several second for example to compute, the authentication unit 110 can compute it very rapidly, perhaps within several nanoseconds. Placing a response time limit on the authentication unit 110 can ensure that the response is provided by an actual hardware implementation of the authentication unit 110. The large number of possible challenges and challenge responses preclude an impersonator from having precomputed all possible responses from which a rapid response supplied. Thus, a timely response may only be possible from the one particular hardware instance of the authentication unit 110. As such, the authentication unit 110 containing the HPPUF 150 can serve as a secure authentication token.

Figure 3:
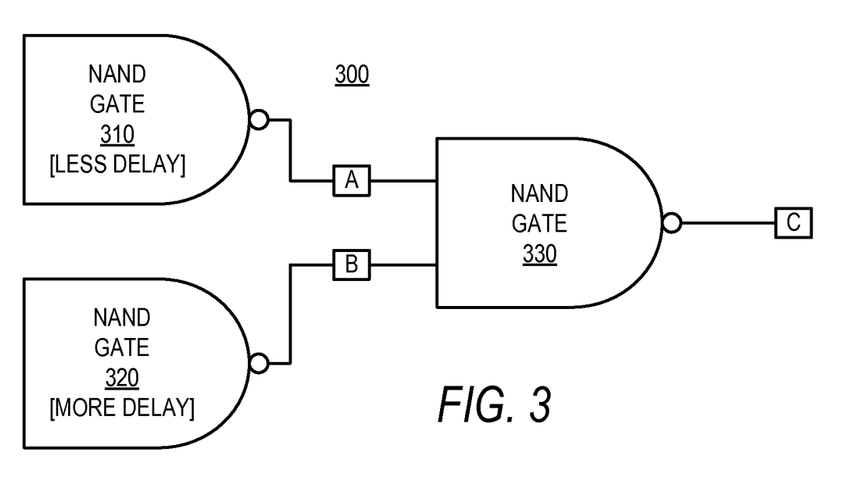
FIG. 3 is a circuit diagram illustrating three logic gates arranged to demonstrate the effects of varying gate delays.

Turning now to FIG. 3, a circuit diagram 300 illustrates three logic gates arranged to demonstrate the effects of varying gate delays according to one or more embodiments presented herein. NAND gate 310 and NAND gate 320 may provide their outputs as inputs to NAND gate 330. NAND gate 310 may have a slightly lower delay than the delay of NAND gate 320. Thus, the output (signal A) of NAND gate 310 may arrive at the input of NAND gate 330 prior to the output of NAND gate 320 (signal B). The output of the NAND gate 330 (signal C) can depend upon both signal A and signal B since NAND gate 330 takes signals A and B as its input.

Figure 4:
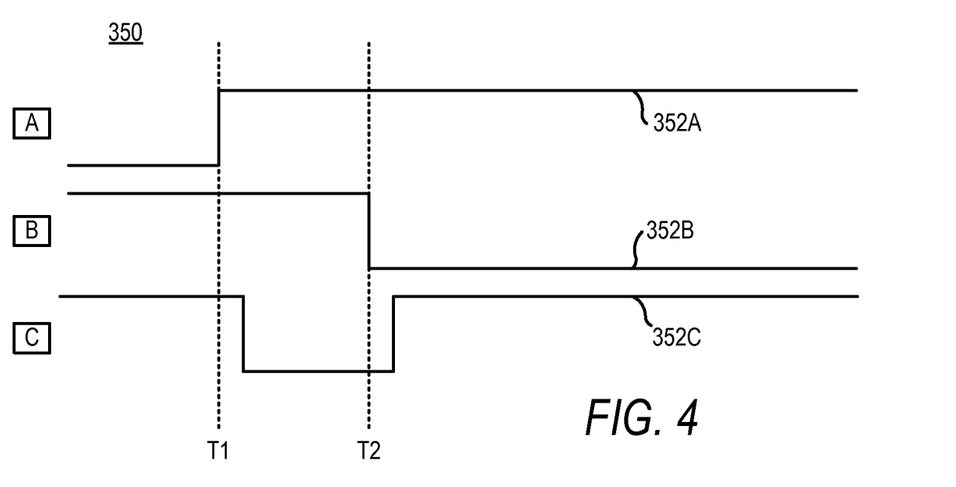
FIG. 4 is a timing diagram illustrating the effects of varying gate delays between two layers of a hardware public physically unclonable function.

Turning now to FIG. 4, a timing diagram 350 illustrates the effects of varying gate delays between two layers of a hardware public physically unclonable function according to one or more embodiments presented herein. The signals within the timing diagram 350 are those defined with respect with FIG. 3. The NAND gate 310 output is signal A and is illustrated as timing trace 352A. The NAND gate 320 output is signal B and is illustrated as timing trace 352B. The NAND gate 330 output is signal C and is illustrated as timing trace 352C. The transition of the NAND gate 310 output (signal A) is at time T1 and is followed later at time T2 with the transition of the output from NAND gate 320 (signal B). The trace 352C for signal C illustrates the output of NAND gate 330 taking signal A and signal B as its input. The trace 352C for signal C illustrates how the output of NAND gate 330 may transition at each transition of its input. Thus, the delay between the two inputs from NAND gate 310 and NAND gate 320 may cause the output of NAND gate 330 to actually transition twice even though there is only one transition at each of the inputs. With a potentially doubling of signal transitions at each layer in a stack of two-input gates, layer H may have as many as $2^H$ signal transitions over a short period of time. The output of the authentication unit 110 may be obtained by sampling this sequence of transitioning values at a specified time. The slight delay in transitions within the trace 352C for signal C may be related to the delay through NAND gate 330.

Sampling the sequence of transitioning output values may require a very accurate timing mechanism. The accuracy requirement may increase exponentially with H. Values for H may be in the range of 3-30, or more. A value of H=10 or H=20 may be currently reasonable for manufactured logic gates. A value of H=30 may be considered a limit of on-chip clocking according to certain semiconductor embodiments. A value of H=70, or more, may be possible with advanced clocking techniques such as technology used in atomic clocks.

Figure 5:
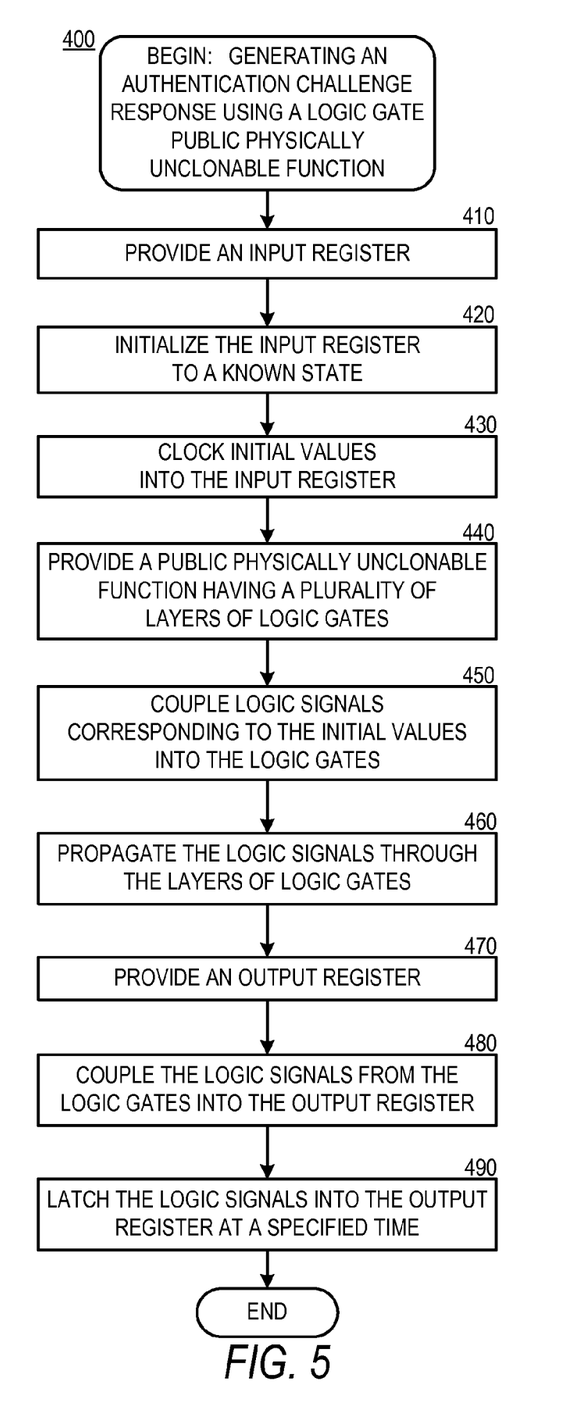
FIG. 5 is a flow diagram illustrating a process for generating an authentication challenge response using a logic gate public physically unclonable function.

Referring now to FIG. 5, additional details will be provided regarding the embodiments presented herein for secure authentication using hardware public physically unclonable functions. In particular, FIG. 5 is a flow diagram illustrating a process 400 for generating an authentication challenge response using a logic gate public physically unclonable function according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

Process 400 begins at operation 410, where an input register 140 is provided within an authentication unit 110. The input register 140 can be used for loading the initial values from an authentication challenge into the HPPUF 150. Continuing to operation 420, the input register can be initialized to a known state. The known state for initializing the input register 140 may be specified as part of the authentication challenge or alternatively the input register 140 may be initialized to a specific predetermined state such as all zero, all ones, or any other vector that can be loaded into the input register 140.

Continuing to operation 430, the initial values for the authentication challenge may be clocked into the input register 140. The values loaded into the input register 140 may be clocked into the register using input clock 145. Continuing to operation 440, an HPPUF 150 may be provided within the authentication unit 110. The HPPUF 150 may have a plurality of layers of logic gates as illustrated in FIG. 2. Continuing to operation 450, logic signals corresponding to the initial values from the input register 140 may be coupled into the logic gates of the HPPUF 150.

Continuing to operation 460, the logic signals coupled into the HPPUF 150 may be propagated through the layers of logic gates. At each additional layer of logic gates the number of transitions in signals can double. For H layers of logic gates the number of signal transitions may be as many as $2^H$. Continuing to operation 470, an output register 160 may be provided within the authentication unit 110. Continuing to operation 480, the logic signals from the HPPUF 150 may be coupled into the output register 160. Continuing to operation 490, the logic signals entering the output register 160 may be latched into the register at a specific time as specified by the interface module 130 via the output clock 165. The process 400 may terminate after operation 490.

Figure 6:
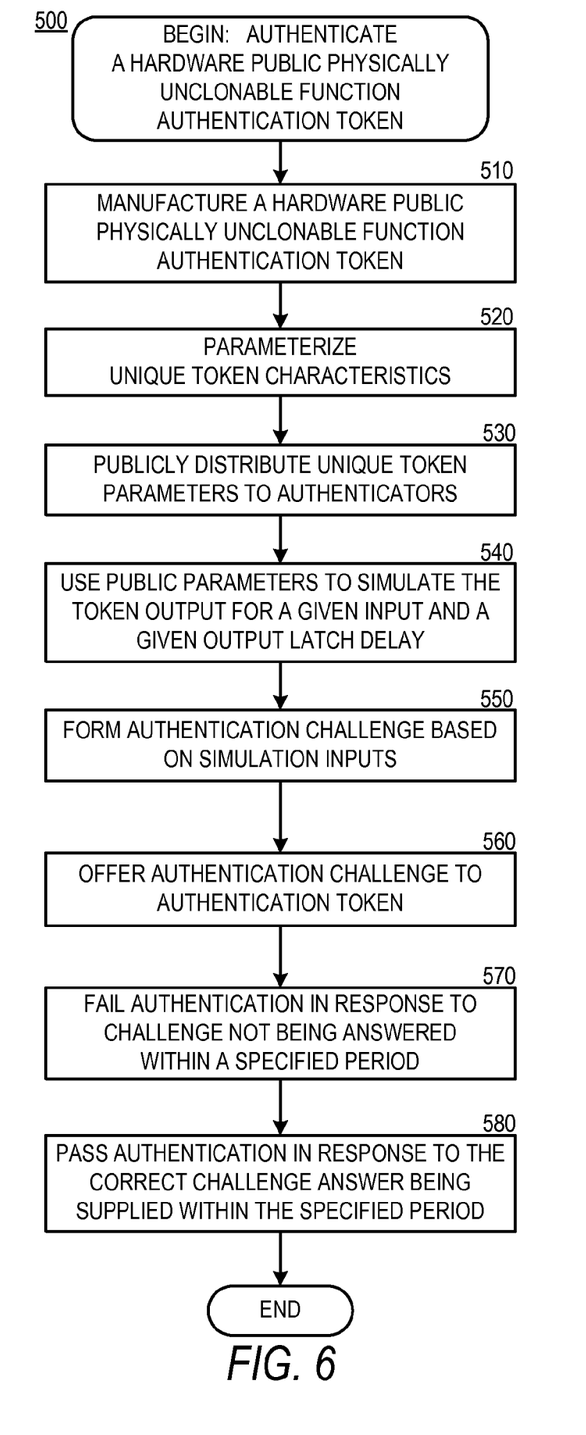
FIG. 6 is a flow diagram illustrating a process for authenticating a hardware public physically unclonable function authentication token.

Referring now to FIG. 6, additional details will be provided regarding the embodiments presented herein for secure authentication using hardware public physically unclonable functions. In particular, FIG. 6 is a flow diagram illustrating a process 500 for authenticating a hardware public physically uncloneable function authentication token according to at least some embodiments presented herein.

Process 500 begins at operation 510, where a hardware public physically uncloneable function authentication token can be manufactured. The HPPUF 150 can be manufactured such that each instance of manufacturing generates a physically unique authentication unit 110. Continuing to operation 520, the unique characteristics of the authentication token, or authentication unit 110, may be parameterized. For example, in a logic gate HPPUF 150, the delay or timing associated with the various gates, or paths through the HPPUF 150, may be characterized.

Continuing to operation 530, data identifying the unique characteristics parameters determined and parameterized in operation 520 may be publically distributed to authenticators. Continuing to operation 540, an authenticator may use the public parameters distributed in operation 530 to simulate a particular instance of an authentication unit 110, or authentication token, to generate an output associated with a given input and a given latch output delay. The latch output delay may be a timing sequence related to triggering the latching of outputs into the output register 160 using the output clock 165.

Continuing to operation 550, an authenticator may form an authentication challenge based on the simulation performed in operation 540. In particular, an authentication challenge may include the particular input vector along with the output latch delay used in operation 540. Alternatively, an authentication challenge may provide the outputs generated by the simulation in operation 540 and challenge the authentication unit 110 to provide the corresponding input. Continuing to operation 560, the authentication challenge may be offered from the authenticator to the authentication token, or authentication unit 110. Because the actual instance of the authentication unit 110 can generate the response to the authentication challenge in an extremely short period of time in comparison to the time required to simulate the outputs, the authenticator requires a timely response from the authentication unit 110 to ensure a proper security authentication. As such, in operation 570, the authentication challenge is failed in response to the challenge not being answered within the specified time period. Alternatively, in operation 580, the authentication challenge is a pass in response to the correct challenge answer being supplied by the authentication unit 110 to the authenticator within the specified time period. The process 500 may be terminated after operation 580.

Figure 7:
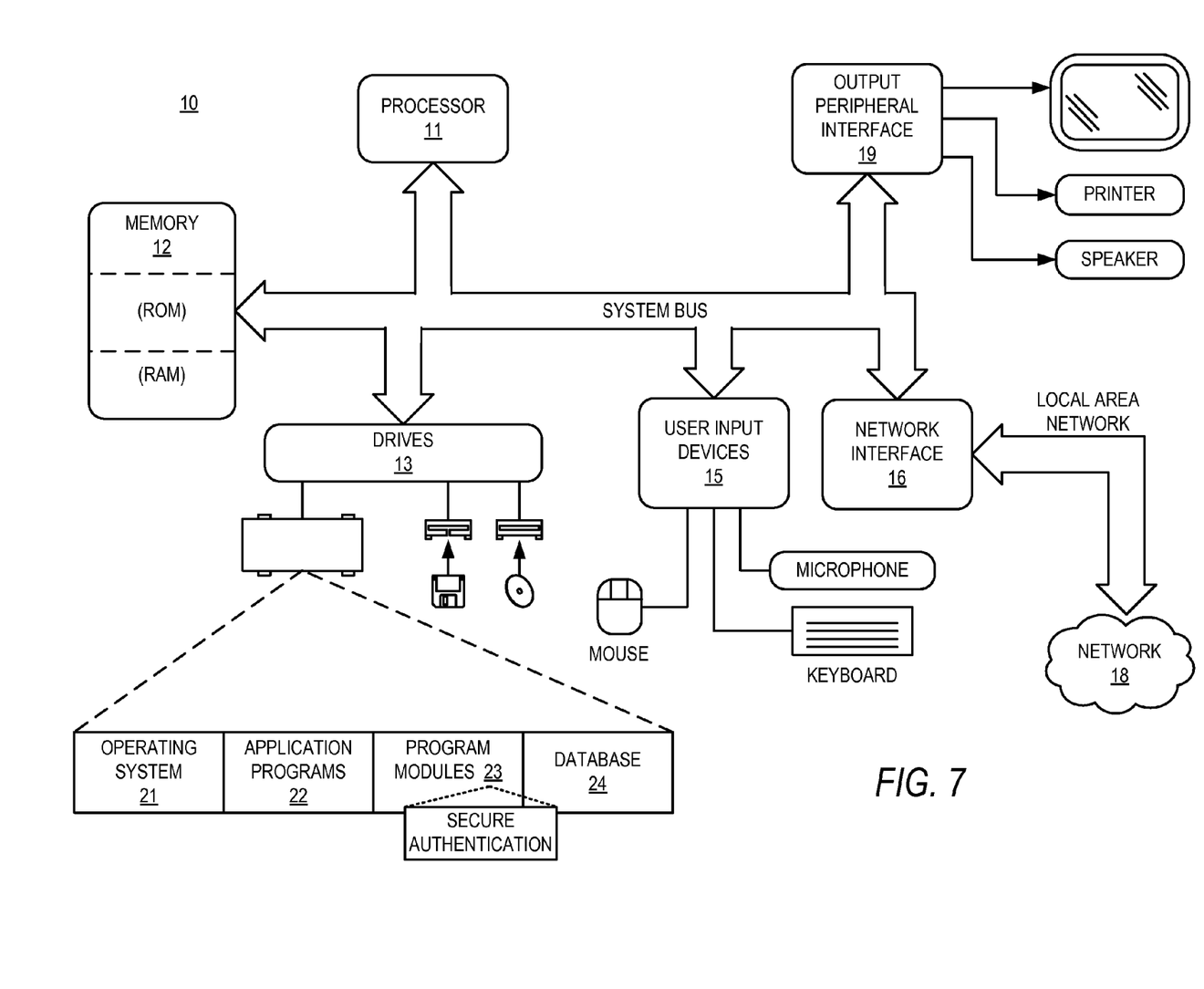
FIG. 7 is a block diagram illustrating an exemplary computing system, all arranged according to embodiments presented herein.

With reference to FIG. 7, an exemplary computing system is illustrated for implementing various embodiments. The computing system can support embodiments for the host computer 120, or a computer used in the manufacture and characterization of the authentication unit 110. The computing system includes a computer 10. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The drives 13, other storage devices, or their associated computer-readable storage media can store an operating system 21, application programs 22, program modules 23, and a database 24. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 can perform secure authentication using hardware public physically unclonable functions in accordance with embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23. The program modules 23 may include software instructions that, when loaded into the processor 11 and executed, transform a general-purpose computing system into a special-purpose computing system customized to facilitate secure authentication using hardware public physically unclonable functions. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support secure authentication using hardware public physically unclonable functions. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more"

or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

What is claimed is:

1. An authentication token device, comprising:
   a hardware public physically unclonable function that includes operational characteristics characterized by publicly available parameters, wherein the parameters are affected by unintentional manufacturing variability of the hardware public physically unclonable function;
   an input register configured to load signals into the hardware public physically unclonable function at an input time, wherein the signals are propagated through the hardware public physically unclonable function so as to transform the signals in accordance with the unintentional manufacturing variability of the hardware public physically unclonable function; and
   an output register configured to sample the transformed signals from the hardware public physically unclonable function at a specified time after the input time, wherein the transformed signals during the specified time differ from other transformed signals sampled at another time due to the unintentional manufacturing variability.

2. The authentication token device of claim 1, further comprising a timing mechanism configured to determine when to latch the transformed signals of the hardware public physically unclonable function into the output register.

3. The authentication token device of claim 1, further comprising an interface to a host computer, the interface coupled to the input register and the output register, wherein the interface is configured to provide the signals to the input register, and wherein the interface is configured to provide the the transformed signals to the host computer such that the host computer can validate the authentication token device based on the the transformed signals.

4. The authentication token device of claim 1, wherein the hardware public physically unclonable function operates within a time period less than a time period required to simulate the hardware public physically unclonable function from the operational characteristics.

5. The authentication token device of claim 1, wherein the hardware public physically unclonable function comprises a plurality of logic gates.

6. The authentication token device of claim 1, wherein the hardware public physically unclonable function comprises nanowires.

7. The authentication token device of claim 1, wherein the hardware public physically unclonable function comprises photonic crystals.

8. A method to generate an authentication challenge response using a hardware public physically unclonable function, the method comprising:
   receiving initial values associated with the authentication challenge into an input register at an input time associated with the hardware public physically unclonable function, wherein the hardware public physically unclonable function is characterized by publicly available parameters that are affected by unintentional manufacturing variability of the hardware public physically unclonable function;
   coupling logic signals corresponding to the initial values from the input register into the hardware public physically unclonable function;
   propagating the logic signals through the hardware public physically unclonable function so as to transform the logic signals in accordance with unintentional manufacturing variability of the hardware public physically unclonable function; and
   receiving a signal to latch the transformed logic signals from the hardware public physically unclonable function into an output register at a specified time after the input time, wherein the transformed logic signals latched during the specified time differ from other transformed logic signals latched at another time due to the unintentional manufacturing variability.

9. The method of claim 8, further comprising initializing the input register to a known state prior to receiving the initial values.

10. The method of claim 8, wherein the hardware public physically unclonable function generates a result within a time period less than a time period used to simulate the hardware public physically unclonable function to generate the result.

11. The method of claim 8, wherein the unintentional manufacturing variability of the hardware public physically unclonable function comprises unintentional manufacturing variability of a plurality of logic gates.

12. The method of claim 8, wherein the unintentional manufacturing variability of the hardware public physically unclonable function comprises unintentional manufacturing variability of nanowires.

13. The method of claim 8, wherein the unintentional manufacturing variability of the hardware public physically unclonable function comprises unintentional manufacturing variability of photonic crystals.

14. The method of claim 8, wherein the authentication challenge comprises a vector of initial values and a timing specification used in latching the transformed logic signals into the output register.

15. A non-transitory computer storage medium that includes computer-executable instructions stored thereon which, when executed by a computer system, cause the computer system to:
  receive public information that characterizes unique parameters associated with a hardware public physically unclonable function;
  formulate an authentication challenge to be posed to the hardware public physically unclonable function;
  simulate the hardware public physically unclonable function based on the public information to generate an expected result to the authentication challenge, wherein the public information is associated with unintentional manufacturing variability of the hardware public physically unclonable function;
  offer the authentication challenge to an authentication device comprising the hardware public physically unclonable function, wherein the expected result is obtained from the hardware public physically unclonable function at a specified time after an input time when signals are loaded into the hardware public physically unclonable function;
  classify the authentication challenge as passed in response to receiving the expected result from the authentication device within a specified time period that is less than a time period required to simulate the hardware public physically unclonable function based on the public information to generate an expected result; and
  classify the authentication challenge as failed in response to not receiving the expected result from the authentication device within the specified time period.

16. The computer storage medium of claim 15, wherein the authentication challenge comprises multiple result requests from the hardware public physically unclonable function.

17. The computer storage medium of claim 15, wherein the authentication challenge comprises a vector of initial values to load into the hardware public physically unclonable function and a timing specification used for latching to latch an output from the hardware public physically unclonable function.

18. The computer storage medium of claim 15, wherein the expected result comprises a set of results generated within a tolerance window of time.

19. The computer storage medium of claim 15, wherein the expected result comprises a statistical sample of a complete output vector.

20. The computer storage medium of claim 15, wherein the hardware public physically unclonable function comprises a plurality of logic gates.

* * * * *

UNITED STATES PATENT AND TRADEMARK OFFICE
CERTIFICATE OF CORRECTION

| | | |
|---|---|---|
| PATENT NO. | : 9,032,476 B2 | |
| APPLICATION NO. | : 12/464387 | |
| DATED | : May 12, 2015 | |
| INVENTOR(S) | : Potkonjak | |

It is certified that error appears in the above-identified patent and that said Letters Patent is hereby corrected as shown below:

Title Page

On Page 2, in Item (56), under "OTHER PUBLICATIONS", in Column 2, Line 48, delete "Boneth," and insert -- Boneh --, therefor.

On Page 2, in Item (56), under "OTHER PUBLICATIONS", in Column 2, Line 50, delete "Infromation" and insert -- Information --, therefor.

On Page 2, in Item (56), under "OTHER PUBLICATIONS", in Column 2, Line 53, delete "Annuual," and insert -- Annual --, therefor.

Claims

In Column 16, Line 23, in Claim 17, delete "used for latching to" and insert -- used to --, therefor.

Signed and Sealed this
Tenth Day of November, 2015

Michelle K. Lee
*Director of the United States Patent and Trademark Office*